Jan. 28, 1969    J. HOEFFELMAN    3,424,343

RECEPTACLES AND METHOD OF MAKING THE SAME

Filed July 19, 1965

INVENTOR
Johan Hoeffelman

BY *Spencer & Kaye*

ATTORNEYS

3,424,343
RECEPTACLES AND METHOD OF MAKING THE SAME

Johan Hoeffelman, Uccle, Belgium, assignor to Hedwin Corporation, Baltimore, Md., a corporation of Maryland
Filed July 19, 1965, Ser. No. 472,850
Claims priority, application Belgium, July 17, 1964, 650,677
U.S. Cl. 220—67  9 Claims
Int. Cl. B65d *11/06, 1/16;* B29c *7/10*

ABSTRACT OF THE DISCLOSURE

A method for assembling a rigid plastic receptacle composed of a tubular body and at least one end piece, which method involves heat sealing the tubular body to each end piece with an elastomer base adhesive which is interposed between the end piece and the body, such an adhesive producing a strong, shock-resistant connection.

---

The present invention relates to receptacles and to a method of making the same.

More particularly, the present invention relates to the manufacture of receptacles made of rigid plastic materials as, for example, unplasticized polyvinylchloride.

Figure 1:
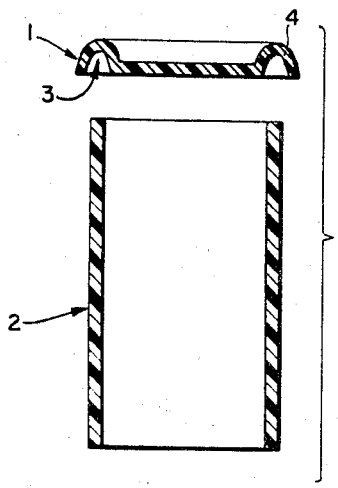
Figure 2:
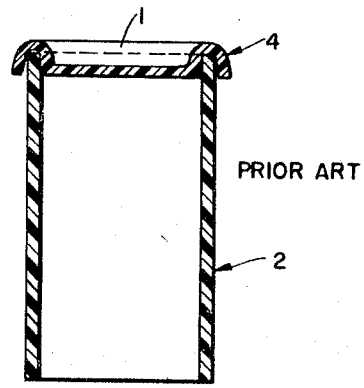

There exist cylindrical receptacles made of plastic materials, which are assembled by securing one or two circular bottoms or so-called end pieces to a tubular cylindrical body which itself is obtained by cutting sections from an extruded tube, the end piece or pieces being secured to the tubular body at a relatively high temperature, such as 180° to 190° C. This is shown in FIGURES 1 and 2, in which the end piece is first aligned with a tubular body 2, after which the edge of the body 2 is secured within the annular groove 3 of the end piece 1. A thus-produced receptacle has a very rigid bottom; in particular, the two annular peripheral regions which are joined together, namely, the edge of the tubular body 2 and the outer flange 4 of the end piece 1, will be exceedingly rigid. These rigid parts, however, constitute very fragile zones so that, should the receptacle be dropped accidentally, even from a low height, the entire packing will usually break.

It is, therefore, the primary objects of the present invention to provide a way of manufacturing receptacles of the above type which, however, are able to withstand accidental falls.

It is a further object of the present invention to provide a way of manufacturing such rupture-resistant receptacles in a simple and efficient manner.

With the above objects in view, the present invention resides, mainly, in a method of making a plastic receptacle, which method includes the step of heat sealing a tubular body to at least one end piece which closes an end of the tubular body with an adhesive, especially an elastomer base adhesive, which is interposed between the end piece and the tubular body.

The present invention further resides in receptacles made in accordance with the above method.

Additional objects and adavntages of the present invention will become apparent upon consideration of the following description when taken in conjunction with the accompanying drawings in which:

FIGURES 1 and 2, already referred to above, are sectional views showing the two manufacturing steps according to the prior art.

Figure 3:
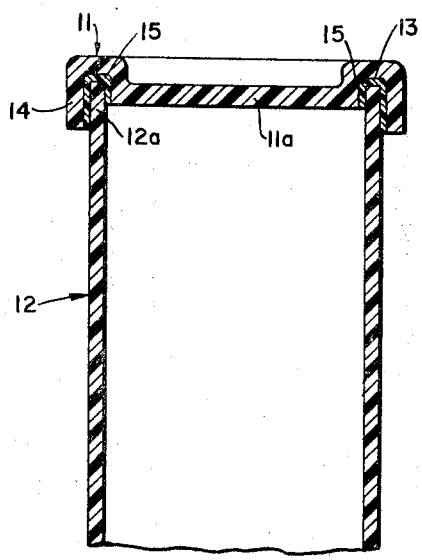

FIGURE 3 is a fragmentary sectional view of a receptacle manufactured in accordance with the present invention.

Referring once more to the drawings and now to FIGURE 3 thereof, the same shows an end piece 11 secured to a tubular cylindrical body 12, the end piece 11 having an annular peripheral groove 13 which is formed between the main body portion 11a of the end piece 11 and the annular flange 14. The edge portion 12a of the tubular body 12 is received within the annular groove 13. Interposed between the tubular body 12 and the end piece 11 is an adhesive 15. In the arrangement shown in FIGURE 3, the adhesive fills the entire space between the body 12 and the end piece 11 and also secures the outer flange 14 of the end piece to the outer surface of the edge portion 12a of the body 12.

The other end of the tubular body 12 may be closed off in a similar manner.

The tubular body and the end piece may be made of unplasticized polyvinylchloride, which is an exceedingly rigid material. Alternatively, the tubular body and the end piece may be made of other plastic materials, as, for example, polystyrene, polymethylacrylate, and the like.

The adhesive itself is heat sealed to the tubular body and the end piece; if these parts are made of unplasticized polyvinylchloride, the temperature at which the heat sealing is effected is between approximately 120° C. and 140° C., rather than the relatively high temperature range of between 180° to 190° C. which was heretofore customary.

The adhesive is preferably deposited in the groove 13 of the end piece 11. This can be done immediately prior to the heat sealing, or, if a thermoplastic adhesive is used, the groove of the end piece may be lined with a coat of such adhesive and be stored beyond the time it takes for the adhesive to set. Alternatively, a ring of the adhesive, cut a thin film, can be placed into the groove prior to the heat sealing.

The adhesive itself may be any suitable thermoplastic. If the receptacle is made of polyvinylchloride, any common adhesive can be used, as, for example, a polyvinylchloride base adhesive, a polyacrylate base adhesive, or a copolymer having a chloride base or a vinyl acetate base.

Especially good results—insofar as shock-resistance is concerned—have been obtained with the use of an elastomer base adhesive, such as an adhesive having a rubber nitrile base or a neoprene base. This is believed to be due to the fact that a film of adhesive is formed between the tubular body and the end piece, which film serves as an elastic cushion that absorbs the shocks to which the parts may be subjected in case the receptacle is dropped. In order that this film properly fulfill its function, it should be well distributed within the space between the tubular body and the end piece, i.e., the adhesive should fill the entire space between the tubular body and the end piece and thus also lie between the inner and outer surfaces of the edge portion 12a of the body 12 and the walls of the end piece which define the groove 13, after which the joint is subjected to heat. In this way, the outer flange 14 is well secured to the outer surface of the edge portion 12a.

The following examples are illustrative of the present invention; the first example describes the prior art and the subsequent examples pertain to receptacles made in accordance with the present invention, thereby to provide a comparison between the prior art and the present invention.

EXAMPLE 1

A receptacle was made in accordance with the prior art, as described in connection with FIGURES 1 and 2. The receptacle consisted of a cylindrical body and of two end pieces, each made of rigid polyvinylchloride and being 0.4 mm. thick. The parts were secured to each other by plastic welding, at a temperature of 190° C. The diameter and length of the receptacle was such to give it a capacity of 1 liter. The receptacle, filled with water, was found to rupture when dropped from a height of 30 to 40 cm.

EXAMPLE 2

A 1-liter receptacle, whose tubular body and end pieces were similar to those described in Example 1, was assembled in accordance with the present invention, the tubular body and the end pieces being secured to each other with the interposition of acrylic adhesive, heat sealed at a temperature of 130° C.

The external flanges of the end pieces did not manifest any tendency to become detached from the walls of the tubular body. Despite the relatively low heat sealing temperature, the receptacle, filled with water, was found to be able to withstand falls from heights of the order of 50 cm.

EXAMPLE 3

A 1-liter receptacle was made in the manner described in Example 2, except that the adhesive was a rubber nitrile base adhesive, the same having been set at 130° C.

The rubber nitrile base adhesive was composed of the following:

| | Parts by weight |
|---|---|
| Acrylic butadiene nitrile copolymer | 15 |
| Phenolic resin | 6 |
| Calcium carbonate | 2 |
| Methyl ethyl ketone | 77 |

The external flanges of the end pieces of this receptacle, too, did not manifest any tendency to become detached from the walls of the tubular body. Furthermore, the receptacle, filled with water, was found, despite the relatively low setting temperature, to withstand falls from heights of more than 1 meter.

EXAMPLE 4

A 1-liter receptacle was made in the manner described in Example 2, except that the heat sealing operation was carried out at 135° C. and the adhesive was a neoprene base adhesive having the following composition:

| | Parts by weight |
|---|---|
| Neoprene | 19 |
| Phenolic resin | 4 |
| Calcium carbonate | 1 |
| Ethyl acetate | 36 |
| Methyl ethyl ketone | 21 |
| Olefin hydrocarbons | 19 |

The external flanges of the end piece did not manifest any tendency to become detached from the walls of the tubular body. Furthermore, despite the relatively low setting temperature, the receptacle, filled with water, was found to withstand falls from heights of more than 1 meter.

EXAMPLE 5

A 1-liter receptacle was made in the manner described in Example 2, except that the heat sealing operation was carried out at 125° C. and the adhesive was a chloropolyethylene base adhesive having the following compositions:

| | Parts by weight |
|---|---|
| Chloropolyethylene | 22 |
| Toluene | 58 |
| n-Butanone | 14 |
| White spirit | 6 |

This receptacle, too, when filled with water, was able to withstand falls from heights of more than 1 meter.

EXAMPLE 6

A 1-liter receptacle was made in the manner described in Example 2, except that the heat sealing operation was carried out at 140° C. and the adhesive was a vinyl ethylene acetate copolymer base adhesive having the following composition:

| | Parts by weight |
|---|---|
| Vinyl ethylene acetate copolymer | 28 |
| Methyl ethyl ketone | 36 |
| Ethyl acetate | 36 |

This receptacle, too, when filled with water, was able to withstand falls from heights of more than 1 meter.

EXAMPLES 7 THROUGH 12, INCLUSIVE

In each of these examples a 1-liter receptacle was made as described in Example 2, but using different commercially available adhesives, as set forth in the Table 1, which also shows the temperatures used in conjunction with the respective adhesives. In each case, the external flanges showed no tendency to separate from the wall of the tubular body, even when the receptacle, filled with water, was dropped from heights of over 1 meter.

TABLE 1

| Example | Type of adhesive | Manufacturer's designation | Manufacturer | Setting temperature, ° C. |
|---|---|---|---|---|
| 7 | Rubber nitrile | Adhesif 1475 | Bostik (France) | 120 |
| 8 | do | Colle 740 HS | Saba (Netherlands) | 125 |
| 9 | do | Adhesif 847 | Minnesota Mining and Manufacturing Co. (U.S.A.) | 130 |
| 10 | do | Adhesif N 171 | Armstrong (U.S.A.) | 135 |
| 11 | do | Pliobond 20 | Goodyear (U.S.A.) | 140 |
| 12 | Neoprene | Colle Pattex | Henkel (Germany) | 130 |

It will be understood that the above description of the present invention is susceptible to various modifications, changes, and adaptations, and the same are intended to be comprehended within the meaning and range of equivalents of the appended claims.

What is claimed is:

1. An article of manufacture, a receptacle having a generally tubular body and at least one end piece for closing an end of said tubular body member, said end piece having a body portion and a peripheral channel arranged to receive one end of said tubular body, said tubular body having an end portion which is arranged within said channel; and means permanently adhesively bonding said tubular body and said end piece to each other, said means comprising an elastomer base adhesive which is interposed between said tubular body and said end piece to form a cushioning layer therebetween which covers the end edge and at least part of the inner and outer surfaces of said tubular body end portion and which maintains said end piece out of direct contact with said tubular body, said adhesive securing said peripheral channel of said end piece to the outer surface of said end portion of said tubular body.

2. A receptacle as defined in claim 1 wherein said adhesive fills the entire space between said two members.

3. An arrangement as defined in claim 1 wherein said tubular body is cylindrical.

4. In a method of making a plastic receptacle composed of at least two substantially rigid members one of which is a hollow tubular plastic body and the other of which is a plastic end piece which is to close one end of the tubular body, the steps of: applying a heat sealable elastomer base adhesive to at least one of said members in the region where it is to be secured to the other member, bringing said two members together so that said adhesive is interposed between them; and subjecting said adhesive and the portions of said members adjacent thereto to heat for heat sealing said adhesive to both said members, said adhesive permanently bonding said members together and forming a cushioning layer of said adhesive between them.

5. The method defined in claim 4 wherein the elastomer base of said adhesive is rubber nitrile.

6. The method defined in claim 4 wherein the elastomer base of said adhesive is neoprene.

7. The method defined in claim 4 wherein the heat sealing is carried out at a temperature of between approximately 120° C. and 140° C.

8. The method defined in claim 4 wherein the tubular body and the end piece are made of unplasticized polyvinylchloride.

9. The method defined in claim 4 wherein the tubular body is heat sealed to two end pieces each closing off a respective end of the tubular body.

References Cited

UNITED STATES PATENTS

| | | | |
|---|---|---|---|
| 1,881,142 | 10/1932 | Smith et al. | 220—81 X |
| 2,555,380 | 6/1951 | Stuart et al. | 156—69 X |
| 2,801,648 | 8/1957 | Anderson et al. | 220—81 X |
| 3,160,542 | 12/1964 | Foye | 156—69 |
| 1,582,219 | 4/1926 | Hopkinson et al. | 220—81 |
| 2,238,681 | 4/1941 | Dorough | 113—80 |
| 2,398,890 | 4/1946 | Howard | 154 |
| 2,511,816 | 6/1950 | Shaw | 154 |
| 2,643,627 | 6/1953 | Wobbe | 220—81 |
| 2,741,402 | 4/1956 | Sayre | 220—67 |
| 3,244,306 | 4/1966 | Stolk | 215—40 |

FOREIGN PATENTS 628,379  5/1963  Belgium.

JOSEPH R. LECLAIR, Primary Examiner.

JAMES R. GARRETT, Assistant Examiner.

U.S. Cl. X.R.

113—120; 229—5.5